United States Patent

Grosse

[15] 3,677,326
[45] July 18, 1972

[54] METHOD OF REDUCING REACTION BETWEEN ADJACENT LAYERS OF LIQUID SUBSTANCES HAVING DIFFERENT DENSITIES

[72] Inventor: Aristid V. Grosse, Haverford, Pa.
[73] Assignee: Reynolds Metals Company, Richmond, Va.
[22] Filed: May 21, 1970
[21] Appl. No.: 39,218

Related U.S. Application Data

[62] Division of Ser. No. 686,924, Nov. 30, 1967, Pat. No. 3,536,818.

[52] U.S. Cl. .................................165/1, 13/21, 110/1 K, 137/154, 165/86, 176/39, 176/49, 219/121 P
[51] Int. Cl. ...........................................F27b 7/08
[58] Field of Search ..............263/33; 110/1 J, 1 K; 165/1, 165/86; 176/86 R, 86 L, 86 G, 86 M, 39, 49; 219/365, 378, 121 P; 261/153, 160; 210/511; 137/205.5, 154, 13; 417/92; 169/27; 13/1, 21; 164/81

[56] References Cited

UNITED STATES PATENTS

| | | | |
|---|---|---|---|
| 1,831,310 | 11/1931 | Lindemuth | 164/81 |
| 2,997,006 | 8/1961 | Grosse | 110/1 J |
| 3,286,012 | 11/1966 | Foex | 13/1 |

FOREIGN PATENTS OR APPLICATIONS

| | | | |
|---|---|---|---|
| 880,232 | 10/1961 | Great Britain | 210/83 |

*Primary Examiner*—Albert W. Davis, Jr.
*Attorney*—Murphy & Dobyns

[57] ABSTRACT

A hollow pipe whose walls are formed of concentric cylinders of different substances may serve as a container for or as a furnace generating high temperatures on the order of 3,000° K. The substances of each cylinder which may be solid at start up are chosen to have liquid densities so that when the substances melt and the pipe is rotated to rim the substances, the layers maintain their desired relationships. One of the cylindrical layers may include uranium disposed so as to support a neutron chain reaction. Other cylindrical layers are provided to protect the uranium against loss due to vaporization and reaction with elements passing through the pipe and to support the uranium layer even when a liquid. Practical applications of the high temperature apparatus include rocketry, MHD generation, and generally any process requiring high temperatures.

6 Claims, 6 Drawing Figures

INVENTOR
ARISTID V. GROSSE

PATENTED JUL 18 1972

INVENTOR
ARISTID V. GROSSE

BY
Burns Doane Benedict Swecker & Mathis
ATTORNEYS 3,677,326

METHOD OF REDUCING REACTION BETWEEN ADJACENT LAYERS OF LIQUID SUBSTANCES HAVING DIFFERENT DENSITIES

This application is a division of Ser. No. 686,924 filed Nov. 30, 1967, now U.S. Pat. No. 3,536,818 granted Oct. 27, 1970.

This invention relates to apparatus for confining high temperature media, and more specifically to methods and apparatus for obtaining, containing and maintaining high temperatures in the center of hollow liquid metal pipes.

BACKGROUND OF THE INVENTION

High temperature research dealing with substances at temperatures on the order of 3,000° to 20,000° K involves the sciences of chemistry, physics, metallurgy and ceramics. Very few compounds, of the millions of known chemical compounds, are stable at temperatures in these ranges. Very few remain in a solid state above 3,000° K. Confinement of gases at these high temperatures is relatively easy because they are very rarefied. On the other hand, confinement of liquids or liquids and solids, or, generally, matter in the condensed state at such high temperatures poses a much more difficult problem. It is this containment of liquids at high temperatures that is the subject matter of this invention.

A corollary problem is to generate temperatures of this magnitude through methods which can be controlled. Where the high temperature is produced by chemical reactions, thermally stable reaction products must be provided. It is known that these can be achieved in several ways such as by combustion of metals and oxygen; through combustion of gaseous mixtures; or through plasma jets. Confining or containing such chemical substances at the temperatures achieved is a limitation on the time the reaction can be allowed to continue.

In my U.S. Pat. No. 2,997,006, issued on Aug. 22, 1961, the combustion of a highly exothermic metal and oxygen in a rotating furnace is described. Upon rotation of the furnace, the continuous mass of molten metal spreads to cover the entire inner surface of the refractory lining, forming what has been characterized as a "liquid pipe". A limiting factor of the furnace is the dissociation temperature of the refractory material which lines the reaction area.

There is described in Science, May 17, 1963, Vol. 140, No. 3568, at pages 781–789, and in the Journal of the American Chemical Society, Vol. 84, page 3209 (1962) the heating of liquid metals in the form of a liquid pipe by means of an electric current, a plasma jet, and a chemical reaction. In the first-mentioned article, it was also proposed to incorporate fissionable material as the heat source in a liquid pipe for the purpose of producing rocket thrust.

High temperature plasma jets with a noble gas such as helium or argon having temperatures in the range of 5,000° to 15,000° K have been used as a source of heat for a centrifugal furnace. Such a furnace may consist of a steel cylinder surrounded by a coolant jacket and rotated to rim the contained material when liquid. The interior of the steel cylinder may be filled with an insulating material such as alumina bubbles or Thermax (TM) carbon.

Major problems inherent in attempting to make practical use of such liquid pipes include the evaporation of the liquid metals into a gas stream which may flow through the device, chemical reactions between the various adjacent materials making up or contacting the pipes, and miscibility of these adjacent layers at the high temperatures.

Accordingly, the primary object of the present invention is to provide novel methods and apparatus for obtaining, containing, and/or maintaining high temperatures.

Another object is to provide a novel multi-layered pipe which can be rotated to maintain a hollow pipe configuration even when the materials are in a liquid state. The means of generating the high temperature may be external of the hollow pipe, or the materials forming the walls in the pipe may contribute in whole or in part to the generation of the temperatures achieved.

A still further object is to provide novel methods and apparatus allowing the attainment of higher temperatures than has heretofore been possible, particularly with nuclear chain reactions by providing a cylindrical layer containing uranium to support the chain reactions. A novel protective layer on the surface of the uranium to reduce the rate of evaporation of the uranium may be provided along with a layer of supporting material which has a liquid density sufficiently high to "float" the uranium when in a liquid state.

Yet another object is to provide a liquid pipe having at least three concentric layers of metallic or non-metallic substances which, when in a liquid state, maintain the desired configuration to thereby allow heating of the interior of the pipe to higher temperatures than would otherwise be possible. By passing a fluid through such a pipe, the fluid may be heated and thereafter used as a source of energy.

Other objects are to provide a protective layer on the innermost surface of such a liquid pipe that will minimize undesired reactions between the pipe surface and the media in the interior of the pipe and that will minimize loss of material from the interior pipe surface due to vaporization; and to provide interposition layers that minimize or reduce reactivity between adjacent layers in the pipe wall by use of substances which are nonreactive at high temperatures.

SUMMARY OF THE INVENTION

The present invention is characterized by the presence of high temperatures up to the order of 3,000° K. and even higher in some applications by use of concentric cylinders which provide layers of metallic or non-metallic substances that will maintain their configuration even when heated to their liquid state. The heat may be applied from an external source, or one or more of the layers may serve as the heat source. One feature resides in the provision of a protective layer having a high boiling point and low vapor pressure. Another feature resides in providing several different metallic or non-metallic substances, all of which have high boiling points and each being in a different layer and remaining in such a configuration even when heated to melting temperatures and thereafter allowed to cool.

Where one of the layers is capable of supporting a nuclear reaction and hence contains a fissionable material such as uranium, it is advantageous to provide adjacent layers that serve to prevent loss of the uranium through vaporization or migration of the uranium to the extent the chain reaction is stopped. Introduction of substances to be heated may serve also as a means of cooling the apparatus.

Chemical reactions between the substances of various layers may be minimized by using materials which do not form at high temperatures stable compounds such as carbides or oxides, and these materials may sometimes be used in very thin layers as an interposition layer at the interface between two thicker layers of a liquid metallic and non-metallic substance. This interposition layer may have a density higher than that of the supporting layer.

DESCRIPTION OF PREFERRED EMBODIMENTS

Figure 1:
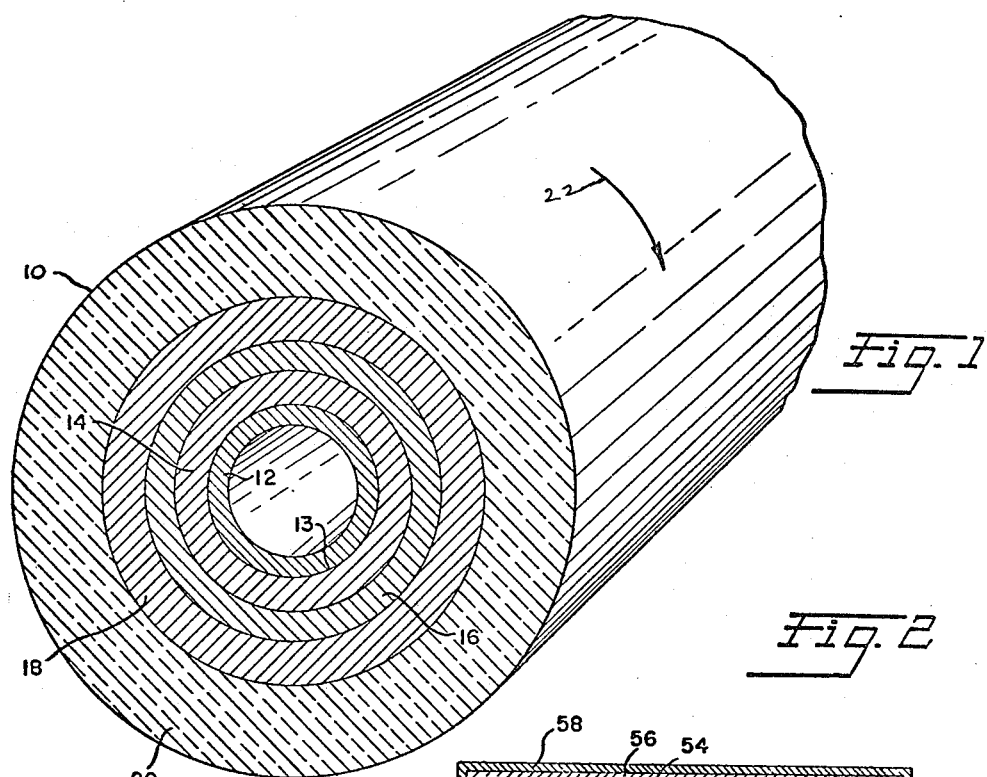
FIG. 1 is a diagrammatic pictorial view of a rotating pipe showing an outer solid body containing several concentric inner layers which may be in a liquid state and of different materials.

FIG. 1 shows diagrammatically a multi-layered pipe 10 that embodies the present invention. The thicknesses of the various layers are not drawn to any particular scale, since the drawing is to illustrate qualitatively the relative positions of the various layers. The inner three concentric layers 12, 14, and 16 are different materials which usually are solid at room temperature but which become liquid at elevated temperatures. Layer 18 may be a somewhat solidified layer of the same material as layer 16. Layer 20 is a body that remains solid and can be regarded as a refractory lining. Refractory materials suitable for use as layer 20 include aluminum oxide bubbles and bricks, or Thermax (trademark) carbon, zirconia, beryllium oxide, calcium oxide, and many other refractory materials. At the center of the liquid pipe and inside of layer 12, free space is provided for confining and conveying heated gases or other materials. When the temperature at the central free space exceeds the melting temperature of the innermost layer 12, it is necessary that the entire pipe be subjected to rotation as designated by arrow 22 to provide a centrifugal force of such a magnitude that it overcomes the force of gravity. This then holds the liquid layer(s) in the concentric configuration to provide what is referred to as a "liquid pipe."

Figure 2:
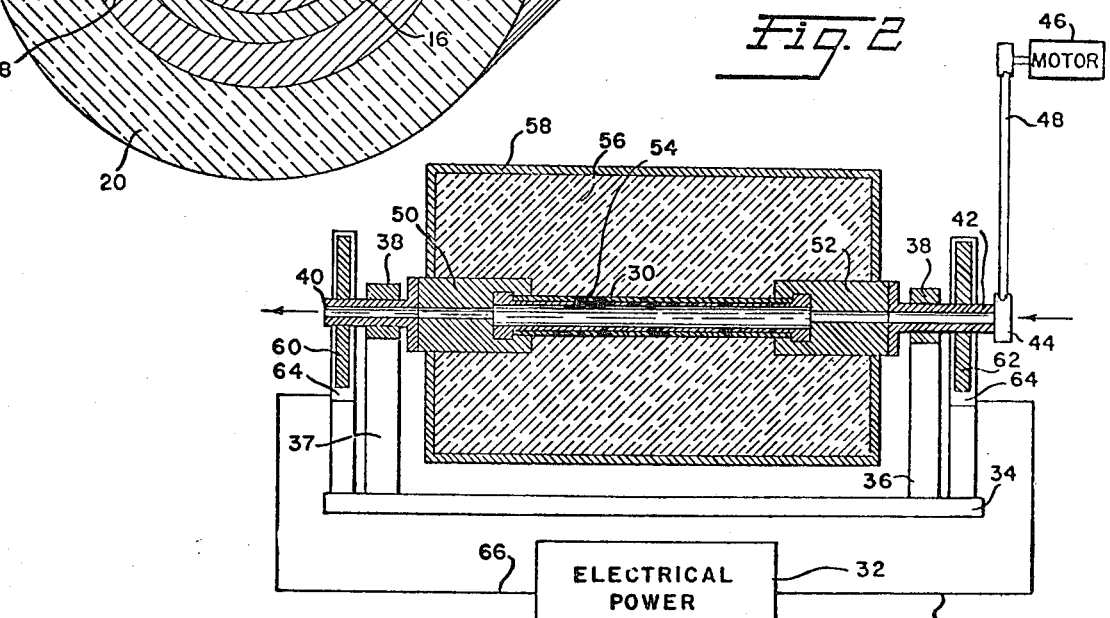
FIG. 2 is an elevation in section of a barrel and frame for an electrical liquid pipe apparatus.

FIG. 2 illustrates an embodiment wherein the heating source is an electrical resistance material 30 that carries an electrical current from a source 32 of electrical power. The apparatus has a base 34 and a pair of supports 36 and 37 with journals 38 through which the ends of shafts 40 and 42 of conductive material are mounted for rotation. Pulley 44 is shown on shaft 42 and rotational force may be provided as by motor 46 and belt 48.

A pair of blocks 50 and 52 of a material such as graphite, which is both heat resistant and electrically conductive, may be joined to turn with shafts 40 and 42. Extending between blocks 50 and 52 is a pipe which may embody certain of the features of the present invention. As illustrated, the pipe comprises two layers 30 and 54. Layer 30 may be the electrical conducting layer, for example, liquid metal, and layer 54 an electrically non-conducting material. Outside pipe 54, a suitable body 56 of insulation such as Thermax (trademark) may be provided that is held in place, as by a cylindrical frame 58.

Near the ends of shafts 40 and 42, slip ring connections 60 and 62, capable of carrying high current densities, are provided. These may take the form of copper discs which contact a liquid metal pool 64, and the two pools may be connected by leads 66 and 68 to opposite terminals of power source 32.

When direct current is used, the magnetic field created by the large electric current passing through tube 30 when in a liquid state constricts and finally pinches off the liquid, thus breaking the circuit. One known method to counteract the pinch effect is by using a centrifugal force greater than the pinch pressure.

When using centrifugal force to maintain continuity, a relationship has been developed which relates rotational speed needed to counteract the pinch effect created by the magnetic field. The relationship was found to be as follows:

$$S = \frac{A}{2.62} / (R\theta \sqrt{D})$$

wherein:

$S$ = angular rotation in revolutions per minute of the rotating pipe,
$A$ = current strength in amperes,
$R$ = inner radius of the pipe in centimeters,
$\theta$ = thickness in centimeters of the liquid conductor layer 30, and
$D$ = density of the liquid conductor metal 30 at the operating temperature in g/cm$^3$.

For example, at a current of 1,000 amperes in a tube where the radius ($R$) is 3.5 centimeters, the thickness of the liquid metal ($\theta$) is 0.30 centimeters, and the density ($D$) is 7 g/cm$^3$, the angular rotation needed to equal the force created by the magnetic pinch effect is 137.5 revolutions per minute. Thus, at rpms higher than 137.5 the current will continue to heat the liquid metal, while below this rpm rate, the current will be interrupted by the magnetic pinch.

In the construction of the apparatus of FIG. 2, layer 30 can be, for example, a material such as mercury which is liquid at room temperature. Of course, if mercury is used in a practical application, steps would have been taken to increase the pressure or otherwise the maximum temperature would be limited by its comparatively low boiling point. Rotation causes it to assume the form of a liquid pipe. Other materials which are solid at room temperature can be inserted initially as a rod or as a hollow pipe. Since rotation occurs during the time the temperature exceeds the melting temperature, the material will assume the form of a cylinder. When cooled again to a lower temperature, the material will remain in the form of a pipe.

Uses of this liquid pipe at temperatures above the melting points of the electrical resistance material include the heating of one or more gases supplied to the input to the hollow shaft at 42 which can be exhausted at the other end for purposes of a heat producing device or for the carrying out of chemical reactions requiring high temperatures.

Referring again to FIG. 1, if the liquid pipe is to be used as a chemical reactor and the source of heat is, as illustrated in FIG. 2, the electrical resistance of one of the liquid layers, an inner layer 12, which might have not only the purpose of cutting down the vapor pressure of the electrical resistance heating layer 14, but which might also essentially chemically protect layer 14, could be used. For example, a liquid oxide such as liquid alumina, zirconia, or thoria could be used as layer 12.

The density of layer 12 should be less than the density of layer 14 to avoid intermixing of the substances when both are liquid and are rotating at a velocity sufficient to maintain the configuration of a pipe as illustrated in FIG. 1.

It is contemplated by the present invention that the electrical resistance heating layer 14 may be supported on one or more further layers 16 and 18 (see FIG. 1) which may also become liquid at the high temperatures reached during operation of the furnace. The density of the further layers when in a liquid state should normally be greater than the density of layer 14.

Where the substances of layers 12 and 16 would undergo an undesirable reaction during the operation of the furnace at their interface, layer 14 may be provided as an interposition layer which will be described in greater detail below. It is possible to make layer 14, if sufficiently thin, float on layer 16 even though the density of layer 14 is greater than the density of layer 16, and still prevent an undesirable chemical reaction between layers 12 and 16.

Figure 3:
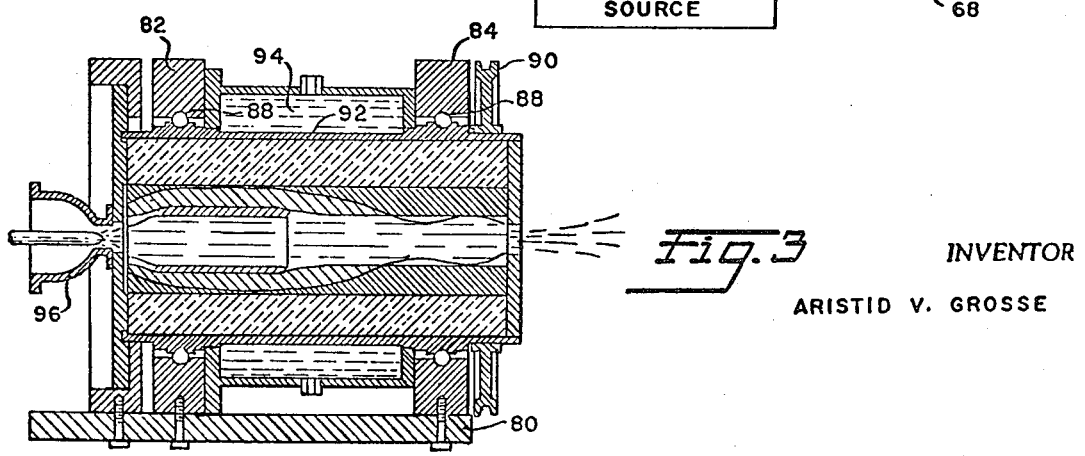
FIG. 3 is an elevation in section of a barrel and frame for a plasma jet liquid pipe apparatus.

Referring now to FIG. 3, an embodiment of this invention is illustrated which comprises a liquid pipe that may be similar to the pipe illustrated in FIG. 1. The base 80 supports rings 82 and 84 that carry bearings 88. Any suitable drive mechanism can be used for rotating pulley 90 which may surround the liquid pipe supporting frame member 92. Frame 92 is shown surrounded by a jacket 94 for a coolant such as water.

The pipe section of the apparatus consists of a number of concentric, coaxial tubular layers forming a pipe, as shown in FIG. 1, encased in frame member 92.

The source of heat here illustrated is a high temperature plasma jet 96 operating in the range of 5,000° to 25,000° K, using a noble gas such a helium or argon. The technology of plasmas and electric arcs is described by W. Finkelburg and H. Maecker in Handbuch der Physik, S. Flugge (Springer, Berlin 1956), Vol. 22, pp. 254–444.

The flow of gas may be from about 0.1 to about 10 SCFM. The electrical energy input may be up to 100 kilowatts or more.

The ratio of the vapor pressure of the container material to the total pressure can be adjusted, if desired, by operating the plasma jet in a liquid pipe at a high total pressure. Thus, apparatus is provided to extend inorganic chemical research, particularly on chemical reactions in liquid phase (for example, between the container and any added substance lighter than the container), to much higher temperature range.

To obtain such a liquid pipe apparatus for conducting high temperature research, tubes of various compositions may be successively melted in the rotating pipe by being heated for a suitable time in the plasma jet. The metals of different densities will form cylindrical bands or layers that are sharply defined and separate. The materials having lower densities are relatively easily positioned on materials having heavier densities which are in a liquid state.

The range of rotations is from 500 to 2,000 rotations per minute. The actual speed of rotation depends on the radius of rotation, and be such that the liquid is subjected to 1 to 5 g.

It has been found that a liquid 14 can be used as an interface or interposition layer between layers 12 and 16 to minimize chemical reactions between them, as discussed above. I have found that metals which, although they are denser than liquid 16, can be made to float on liquid 16, and to act as a suitable barrier between layers 12 and 16. To illustrate the above further, the following laboratory experiment is provided.

About 250 grams of an equal molar mixture of sodium iodide and potassium iodide were placed in a 300 cc. vycor beaker and melted in a butane-oxygen flame. The melting point of the salt mixture is about 600° C. ; it was heated to about 680° C. at which temperature the density of the salt mixture is 3.29 g/cm$^3$. On top of this mixture, about 250 grams of aluminum metal was melted. (The melting point of pure aluminum is 660° C.). It floated on the salt since its density is 2.4 g/cm$^3$ at its melting point. A continuous stream of argon was passed into the free space above so as to prevent the oxidation of the aluminum.

In this case, the interposition substance selected was liquid tin which was melted in a vycor tube with a narrowed down tip closed by means of a vycor rod. (The melting point of tin is 232° C.).

The tip of the vycor tube was placed a few millimeters above the liquid aluminum/salt interface and a few centimeters of liquid tin were slowly added to the liquid aluminum metal. This liquid tin spread in the liquid aluminum layer and did not drop to the bottom, although its density equals 6.75 g/cm$^3$ at this temperature. However, if the tip of the vycor tube was then lowered below the aluminum/salt interface, the liquid tin dropped right away, as expected, to the bottom of the beaker in the form of a metallic globule.

The whole melt was allowed to cool down, the salt washed out, and the main metal ingot containing the tin was analyzed. A layer a few millimeters thick was sawed off from the bottom of the ingot and was found by analysis to contain 46 weight per cent tin and 54 weight per cent aluminum. At 680° C. this alloy has a density of 3.37 g/cm$^3$. Thus, while the alloy was denser than the salt, it still floated on the molten salt, and acted successfully as an interposition substance between the lighter aluminum metal and the heavier molten salt.

Other metals which may be used as an interposition layer are the monetary and noble metals, copper, silver, gold, platinum and iridium. Even though their densities as a liquid may exceed the density of the supporting layer as a liquid, they may be introduced between two adjacent layers and remain attached to the boundary between the two layers.

Figure 4:
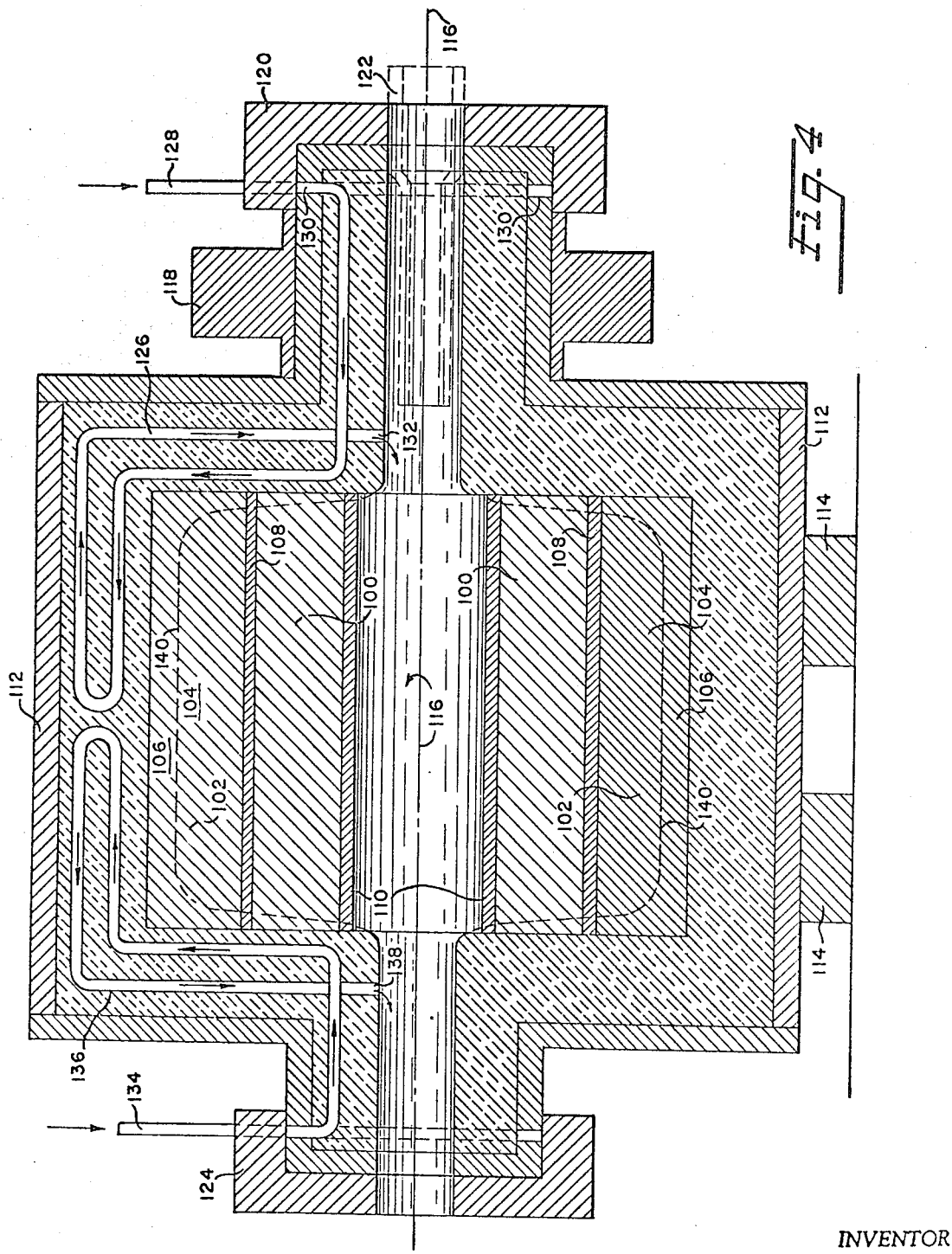
FIG. 4 is an elevation in section of a barrel and frame of a further structure embodying three concentric layers of different materials which, when heated, may be in liquid form, together with means for removing the heat.

Referring now to FIG. 4, a further embodiment of the present invention is illustrated wherein the high temperature is generated by nuclear reactions, such as a fission chain reaction propagated by neutrons in a cylindrical mass of isotope 235 of uranium, isotope 239 of plutonium, or any other fissionable material. In this embodiment, one of the layers, such as layer 100 of the multilayered pipe, is a fissionable material and is capable of supporting a sustained chain reaction for a period of several seconds or minutes in the case of an application to produce rocket thrust, or much longer for other applications, such as MHD generators and in provoking high temperature reactions. The starting and stopping of the chain reaction may be by the removal and introduction of neutron absorbing substances, such as cadmium or boron. Other layers include a supporting layer 102 which may be in a liquid state in region 104 and in a solid state in region 106. Between layers 100 and 102, an intermediate or interposition layer 108 may be provided, and on the inner surface of layer 100 a protective layer 110 may be provided.

An outer cylindrical casing 112 may be provided to surround the supporting material forming layer 102 and be suitably mounted for rotation on means such as rollers 114. Rotation about axis 116 can be effected by any convenient means, such as pulley 118, located at the inlet side of the apparatus. Also, at the inlet side, a standard stationary stuffing box 120 is provided. Inside stuffing box 120, a stationary pipe 122 may be mounted which has space or openings provided to accommodate various feeding devices for solids, liquids, or gases. On the outlet side, a stationary stuffing box 124 similar to inlet stuffing box 120 may be provided.

An optional cooling system is illustrated in the upper half of the drawing of FIG. 4. If the cooling system is used, it would also be present through out the entirety of support layer 102 since the apparatus is symmetrical about axis 116. The illustrated cooling system consists essentially of a first conduit 126 for circulating a cooling fluid introduced through an inlet 128 on stuffing box 120. Fluid entering inlet 128 travels through a suitable groove 130 to enter conduit 126 and follows the direction of the arrows to be ejected into the central open portion of the apparatus at outlet 132. A similar cooling system may be provided at the outlet end of the apparatus that is composed of inlet 134, conduit 136, and outlet 138. The function of conduits 126 and 136 may be for purposes other than cooling, such as to preheat substances that are to be introduced into the heated stream of gas.

Table I from the published literature gives typical data for the normal boiling points and melting points of some high boiling temperature metals and their corresponding heats of vaporization and of fusion. It is evident from the table that the heat required to vaporize a liquid metal is roughly about 25 times greater than the heat of fusion. Thus, to vaporize the liquid metal, a large amount of heat has to be added to the system either by the nuclear reaction or, in the case of electrical resistance heating, by the electrical current, as compared to the relatively small amount of heat that has to be taken out by cooling in order to maintain the metallic substance in a solid state at its edges.

TABLE I

| Metal | Normal Boiling Point °K | Melting Point °K | Heat of Vaporization | Heat of Fusion |
|---|---|---|---|---|
| | | | in cal/gram atoms | |
| Uranium | 4200 | 1406 | 101,000 | 3,700 |
| Thorium | 4500 | 1968 | 130,000 | 3,750 |
| Tantalum | 5700 | 3270 | 180,000 | 7,500 |
| Platinum | 4100 | 2043 | 122,000 | 4,700 |
| Zirconium | 4650 | 2125 | 139,000 | 4,000 |
| Tungsten | 5800 | 3650 | 191,000 | 8,400 |
| Niobium | 5200 | 2700 | 166,500 | 6,400 |

The same theoretical considerations apply to oxides, carbides, nitrides, and other ceramic materials, and although there is no experimental data available at present on the heats of vaporization and of fusion in any way comparable to the data in Table I on liquid metals, it is evident that the heat of fusion is much less than the heat of vaporization.

The vapor pressure of uranium at 4000° K. is 0.21 atmospheres, thus giving it a tendency under high temperature operation to vaporize readily and mix with the gas flowing through the interior of the apparatus. It is, of course, evident that the loss of uranium through this process would quickly stop the reaction since control of the nuclear chain reaction is importantly influenced by the mass of uranium present. In the illustrated embodiment, layer 100 is assumed to be uranium and a protective layer 110 is therefore provided to reduce the rate of vaporization of uranium.

One of the desirable properties of the material forming protective layer 110 is that it has a much lower vapor pressure than uranium, thereby to reduce the rate at which this layer vaporizes and is lost into the gases passing through the center of the apparatus. This material normally should be selected to have also a lower density than that of uranium since, as pointed out previously, the inner layer must in effect float on the next outer layer. Materials which can advantageously be used as the protective layer 110 because of their high boiling points and low density as compared with that of uranium are given in Table II. If tungsten is used, small amounts of molybdenum can be added which will lower its density so that it will be less dense than uranium. The same applies to rhenium.

TABLE II

| Metal | Density at Room Temperature g/cm$^3$ | Normal Boiling Point °K |
|---|---|---|
| Niobium | 8.55 | 5200 |
| Zirconium | 6.09 | 4650 |
| Hafnium | 13.3 | 5500 |
| Molybdenum | 10.2 | 5100 |
| Tantalum | 16.6 | 5700 |
| Tungsten | 19.3 | 5800 |
| Rhenium | 20.53 | 5900 |
| Uranium | 18.7 | 4200 |

From the standpoint of nuclear properites, one of the more important considerations is the neutron capture cross section of protective layer 110. Niobium, zirconium, and molybdenum and certain isotopes of tungsten have comparatively low capture cross sections on the order of 1 barn or less, whereas tantalum and rhenium and other isotopes of tungsten have much higher cross sections.

Isotope 184 of tungsten has a neutron capture cross section of about 2 barns. The same gaseous diffusion equipment can be used to produce tungsten enriched in isotope 184 by working $WF_6$ as is used to produce uranium enriched in isotope 235. The vapor pressure of tungsten at 4,000° K. is $4.62 \times 10^{-4}$ atmospheres and its boiling point is about 5,800° K. Thus, by using tungsten, the vapor pressure of the exposed surface layer in the interior of the liquid pipe is some 450 times smaller than if pure uranium were used. It follows that by using a layer of tungsten only a few millimeters thick, the life of the apparatus will be increased significantly as compared with the life of operation at high temperatures without such a layer.

Summarizing, then, the principal layers of the liquid pipe, as illustrated in FIG. 4, are the heat generating layer containing the fissionable material such as isotope 235 of uranium; the protective layer having a density not greater than that of uranium, a vapor pressure lower than uranium, and a neutron capture cross section sufficiently low to allow the chain reaction to proceed; and finally, a supporting layer 102 to be next described.

The supporting layer may be any suitable substance that can withstand the high temperatures generated in layer 100 containing the fissionable material. Refractory materials in the form of bubbles, beads, and fine powder, and composed of fine substances such as carbon in the form of graphite, $Al_2O_3$, $BeO$, $ZrO_2$, $ThO_2$, $CaO$, and others that have characteristics of refractory materials may advantageously be used. In FIG. 4, layer 102 is illustrated as being composed of a liquid portion 104 and a solid portion 106 separated by a dotted line 140. The material between the solid portion 106 and casing 112 may be an extension of the refractory material used for layer 102 and contain the fluid conduits 126 and 136 described below.

In the selection of a particular material as a supporting layer 102, consideration must be given to the chemical reactions which may take place between the uranium containing layer 100 and the elements or compounds present in supporting layer 102. Some elements are known to be much less reactive than others at high temperatures. Platinum, failing to form either a stable carbide or a stable oxide, is a desirable material for layer 102 except for the fact that liquid platinum has a density of about 19 g/cm$^3$ at its melting point of about 2,000 K. It is desirable to use platinum either as a supporting layer 102 or as an interposition layer 108. The advantage of considering platinum as an interposition layer 108 is that a thin layer can be floated at the interface between two liquid metals even though its density is greater than the density of the material forming layer 102.

The significance of the foregoing is that it is not essential to have all the materials of the pipe positioned according to their respective densities, i.e., with the liquid of layer 12 (see FIG. 1) having the lowest density and the liquid of layer 16 having the highest density. Also, it makes possible the use of two material in nearly adjacent layers that would undesirably react with each other in course of the operation of the device, but this reaction can be prevented by the presence of a comparatively nonreactive material as an interposition layer which can be very thin.

Thus, in the embodiment of FIG. 4, the interposition layer 108 is illustrated as being between the main layer 100 and the supporting layer 102, while in the embodiment of FIG. 1, the interposition layer 13 is illustrated as being between the main layer 14 and the protective layer 12. In either case, the purpose of the interposition layer is to reduce the reactions between the adjacent layers. Hence, it should be selected from the monetary and noble metals such as copper, silver, gold, platinum, or iridium. The thickness of the interposition layer, if formed of material having a higher liquid density than that of the material on which it floats, must be very thin, e.g., in terms of millimeters.

One of the monetary or noble metals may be used as the entire supporting layer 102 rather than merely as an interposition layer as discussed above. After it was established by experiment that liquid iron carbide, or $Fe_3C$, and liquid silver, or Ag, form a new practically immiscible system at 2,200° K, it was found that by adding uranium dicarbide, or $UC_2$ to this system at 2,000–2,500° K, the uranium dicarbide dissolves in the iron carbide layer and that only a small amount of carbide dissolves in the silver layer. The analysis results of the two layers at 2000°K were as follows:

TABLE III

Composition of Layers

| | Less Dense $Fe_3C + UC_2$ Layer | | More Dense Ag Layer | |
|---|---|---|---|---|
| | wt. % | Atomic % | wt.% | Atomic % |
| Fe | 59.4 | 59.6 | 2.7 | 5.0 |
| U | 31.3 | 7.3 | 1.1 | 0.4 |
| Ag | 2.4 | 1.1 | 95.9 | 92 |
| C | 6.9 | 32.2 | 0.3 | 2.6 |

Thus, the ratio of U in the upper layer to U in the lower layer is about 18. Hence, a system employing silver as layer 102 and $UC_2 + Fe_3C$ as layer 100 in the apparatus of FIG. 4 would maintain a good concentration of the uranium in layer 100.

In view of the high density and high boiling point of gold, this metal was substituted for silver in the above system, but at 2,500° K, and the composition of the layers at that temperature is given below:

TABLE IV

Composition of Layers

| Less Dense | More Dense |
|---|---|
| $Fe_3C + UC_2$ Layer | Au Layer |

|        | wt.%  | Atomic % | wt.%  | Atomic % |
|--------|-------|----------|-------|----------|
| U      | 52.10 | 14.20    | 3.22  | 1.12     |
| Fe     | 36.5  | 42.60    | 21.81 | 34.08    |
| C      | 7.85  | 42.10    | 4.67  | 33.70    |
| Au     | 3.55  | 1.16     | 70.3  | 31.00    |

The ratio of U in upper layer to U in lower layer at this higher temperature is about 15.

Liquid uranium dicarbide, or $UC_2$, has been floated at 3,000° K on liquid $W_2C$. After 10 minutes at 2,950° K, the upper and lower supporting layers had the following composition:

TABLE V

Composition of Layers

|   | Less Dense $UC_2$ Layer | | More Dense $W_2C$ Layer | |
|---|-------|----------|-------|----------|
|   | wt.%  | Atomic % | wt.%  | Atomic % |
| U | 67.50 | 22.59    | 3.64  | 2.68     |
| C | 10.20 | 67.69    | 0.37  | 5.38     |
| W | 22.30 | 9.72     | 95.99 | 91.94    |

It will be observed that as the temperature increases, the diffusion of uranium into the supporting layer increases. However, where the apparatus is intended to operate for only short intervals of time, such as in rocket thrust applications, the temperature of the layers may not reach the maximum temperatures or at least not operate at such temperatures over extended periods of time.

For steady state applications, the selection of specific materials will determine the optimum temperature of operation consistent with the requirements of other parts of the system. Operation of this apparatus on the order of 2,000° to 3,000° K offers many advantages not attainable by other sources of energy.

To construct the apparatus, one may calculate or determine from empirical tests the general configuration the layers should desirably have when in a liquid state and fabricate from solid materials the several layers that are desired. During assembly, the interior of the pipe can be filled with a neutron absorbing material in a liquid or gaseous state to prevent premature start-up of the chain reaction. When it is desired to start the reaction, the neutron absorber may be gradually withdrawn and control effected in any suitable manner of which many are known to those skilled in the art. For example, gases passing through the center of the pipe may include elements having high neutron absorbing properties, or neutron reflectors can be provided on the outside of the uranium pipe and their effective neutron reflective properties modified to change the multiplication factor of the core.

Once the nuclear chain reaction is started, it may be stopped by changing any of the factors which are essential to the reaction. Introduction of heavy concentrations of neutron absorbers into the center of the pipe, as a gas, liquid, or solid, can be effective to stop the reaction. Also, removing reflectors to thereby allow an increase in the escape of neutrons from the exterior of the uranium mass may also be used.

In operation, the material forming protective layer 110 may be lost due to vaporization and contact with other substances flowing through the apparatus. New make-up material may be added during operation of the apparatus for replenishment of the lost material through inlet feeder 122.

Uranium may be added at the same time. As it is heated and becomes liquid, the uranium will diffuse through layer 110 because of the greater density of uranium.

In the apparatus of the present invention, it is important that the ends of the pipe remain solid even though the central portions become liquid. Hence, it is advantageous to have a cooling arrangement such as the piping arrangement illustrated in FIG. 4. By locating the cooler portion of conduit 126 and 136 adjacent the ends of the pipe section, the material on the outer side of dotted line 140 may be kept solid, while the material on the inner side of dotted line 140 is liquid.

The insulating material between supporting layer 102 and outer casing 112 and through which the conduits extend may advantageously be the solid substance of layer 102 in the form of bubbles, beads, fine powder, or any number of available refractory materials like C (graphite), $Al_2O_3$, BeO, $ZrO_2$, $ThO_2$, CaO, and others.

Figure 5:
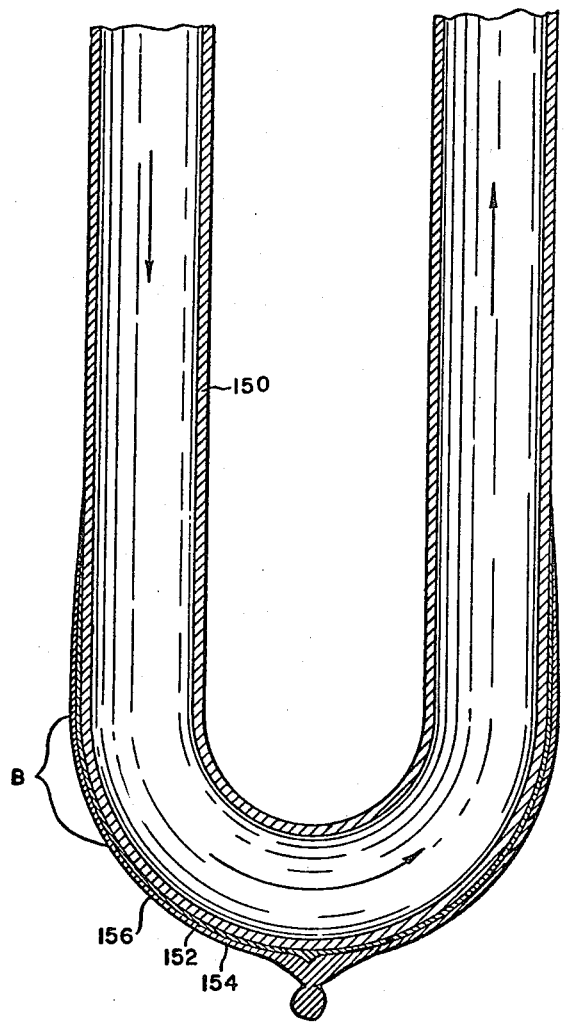
FIG. 5 is a view illustrating the condensation of liquid alumina on a water-cooled aluminum tube.
Figure 6:
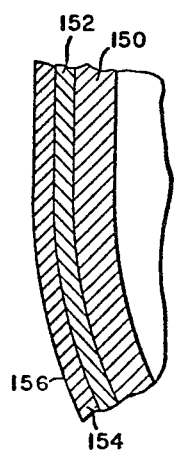
FIG. 6 is an enlarged view of a portion "B" of FIG. 5.

One of the products which can be produced by high temperatures created in a high temperature furnace is alumina vapors. To illustrate the extent of the efficiency of high temperature cooling, the following observations have been made while condensing alumina vapor having a normal boiling point of 3,800° K and a melting point of about 2,050° C. or 2,320° K. With reference to FIGS. 5 and 6, the U-shaped tube 150 is of aluminum and connected to provide for the circulation of water. The interior of the liquid pipe in which U-tube 150 is mounted contains vapors of $Al_2O_3$ at a temperature of about 3,800° K. It has been found that immediately on the outer surface of the aluminum tubing, there is a formation of $Al_2O_3$ in both a solid and a liquid state.

With reference to FIG. 6, which shows to an enlarged scale only a single wall of the aluminum tube of FIG. 5, there is formed on the outer surface of tube wall 150 an $Al_2O_3$ powder layer 152. Next there appears a solid crust 154 in $Al_2O_3$. Finally, on the extreme outer surface, liquid $Al_2O_3$ forms. Thus, over a distance of 0.5 to 0.8 cm. (see FIG. 6) the temperature falls from about 3,800° K in the alumina vapor, to about 300° K in the water flow; therefore, the temperature gradient is from about 7,000° to about 4,400° K/cm. This demonstrates that very high temperature materials can be contained by conventional methods of cooling.

With reference to FIG. 4, the coolant may be introduced through the solid substance of layer 102 which, as pointed out above, may be in the form of bubbles, beads, or fine powder, and allowed to pass directly to the interior of the hollow pipe. A liquid coolant may also be admitted through inlets 128 and 134. After the coolant is preheated, it may flow directly to the central opening of the apparatus, and be introduced into the gas stream flowing therethrough or of course removed from the system as may be desired. Because of the heating which occurs inside the reactor, the amount of coolant that flows into inlet 128 on the cool side of the reactor can be made to be approximately 100 times greater than the amount which flows into inlet 134.

Instead of the coolant being merely an inert gas or liquid which is used directly in the exhaust, the coolant may be a substance which when heated dissociates into elements that are in a liquid or gaseous state. The input materials may also be applied at 122 as a gas, a liquid, or a solid. The temperature within the apparatus and the length of time the material remains in the apparatus determines the quantity of heat that is applied to the material. Such elements, when heated, may be allowed to cool in a condensing unit connected to the outlet of the reactor unit of the present invention, and thereby recovered.

One further important technical advantage is that when the layers are liquids, the quantity of the substance in the various layers can be changed during operation of the apparatus. Specific ingredients can be added when in the form of a solid, a liquid or as a gas or vapor. Ingredients can be withdrawn by evaporation or by removal while in a liquid state.

In summary, the apparatus of the present invention serves as a container for a high temperature and may itself be a furnace, as illustrated by the several embodiments described. The various layers may be formed of different substances depending upon whether the source of heat is an electrical resistance, an oxidation of an organic or inorganic material, or a nuclear reaction. The heated gases passing through the device may be used for MHD generators, rocketry, or in any application where high temperatures are required. Or a confined chamber may be provided for causing chemical reactions.

The main layer may be protected against vaporization by use of a layer having a lower vapor pressure and against chemical reactions by use of nonreactive materials. Liquid oxides, such as liquid alumina, zirconia, or thoria, are comparatively nonreactive in an oxidizing atmosphere. The liquid pipe reactor of the present invention may be used either horizontally or vertically (if sufficient centrifugal force is provided), as may be desired.

The invention may be embodied in other specific forms without departing from the spirit or essential characteristics thereof. The present embodiments are, therefore, to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by Letters Patent is:

1. A method of reducing reaction between two liquid substances having different densities, said method comprising the steps of heating the substances of the two layers to at least the point of liquefaction, then introducing a further substance as a liquid at a location near but not below the interface of the two layers, to provide a thin interposition layer across said interface, said further substance being substantially nonreactive with and having a density greater than the density of each of the other two substances.

2. The method of claim 1 in which said two liquid substances are capable of reacting together at a temperature in excess of 1,500° K. and are maintained when in liquid form by rotation of the substances about a common axis to form concentric cylindrical layers due to the centrifugal force of rotation.

3. The method of claim 1 wherein the layer having the lower density is capable of supporting a neutron chain reaction.

4. The method of claim 1 wherein the interpositioned layer substance is substantially nonreactive with the substances of each of the other two layers and is selected from the group consisting of copper, silver, gold, platinum, iridium and mixtures thereof.

5. The method of claim 1 wherein the heavier of the two substances is a mixture of sodium iodide and potassium iodide, the lighter of the two substances is liquid aluminum and the interpositioned layer is liquid tin.

6. A method for preventing the reaction between two liquid layers of substances which have slow but appreciable reactivity with one another at high temperatures, said method comprising the steps of rotating said layers to form two concentric layers, one of which serves as a heat source for the system, heating the layers to form two liquid concentric layers and then introducing a third substance at a location near but not below the interface between the first two said layers, said third substance being liquid under the conditions of operation, having a density greater than the density of each of the other two substances and being substantially unreactive with the substances in either of the first two layers, and passing a fluid to be heated through the tubular space formed by the concentric layers.

* * * * *

UNITED STATES PATENT OFFICE
CERTIFICATE OF CORRECTION

Patent No. 3,677,326          Dated July 18, 1972

Inventor(s) Aristid V. Grosse          (LQM&D 215)

It is certified that error appears in the above-identified patent and that said Letters Patent are hereby corrected as shown below:

Column 6, Table I, the first two columns should read:

| Metal | Normal Boiling Point °K |
|---|---|
| Uranium | 4200 |
| Thorium | 4500 |
| Tantalum | 5700 |
| Platinum | 4100 |
| Zirconium | 4650 |
| Tungsten | 5800 |
| Niobium | 5200 |

Column 8, Line 19, delete "material" and insert --materials--.

Column 8, Table III, Line 59, delete "32.2" and insert --32.3--.

Columns 8 and 9, Table IV should read:

Composition of Layers

| | Less Dense $Fe_3C + UC_2$ Layer | | More Dense Au Layer | |
|---|---|---|---|---|
| | wt.% | Atomic % | wt.% | Atomic % |
| U | 52.10 | 14.20 | 3.22 | 1.12 |
| Fe | 36.5 | 42.60 | 21.81 | 34.08 |
| C | 7.85 | 42.10 | 4.67 | 33.70 |
| Au | 3.55 | 1.16 | 70.3 | 31.00 |

(page 1 of 2 pages)

UNITED STATES PATENT OFFICE
CERTIFICATE OF CORRECTION

Patent No. 3,677,326      Dated July 18, 1972

Inventor(s) Aristid V. Grosse      (LQM&D 215)

It is certified that error appears in the above-identified patent and that said Letters Patent are hereby corrected as shown below:

(page 2 of 2 pages)

Column 10, Line 1, delete "conduit" and insert --conduits--.

Column 10, Line 27, delete "in" and insert --of--.

Signed and sealed this 1st day of May 1973.

(SEAL)
Attest:

EDWARD M. FLETCHER, JR.      ROBERT GOTTSCHALK
Attesting Officer      Commissioner of Patents